United States Patent
Forkert

(10) Patent No.: US 9,569,667 B1
(45) Date of Patent: Feb. 14, 2017

(54) CLOUD RESILIENT ALGORITHM FOR COASTLINE REGISTRATION

(71) Applicant: Exelis Inc., McLean, VA (US)

(72) Inventor: Richard David Forkert, Fort Wayne, IN (US)

(73) Assignee: Exelis Inc, McLean, VA (US)

( * ) Notice: Subject to any disclaimer, the term of this patent is extended or adjusted under 35 U.S.C. 154(b) by 7 days.

(21) Appl. No.: 14/702,925

(22) Filed: May 4, 2015

(51) Int. Cl.
| | |
|---|---|
| *G06K 9/48* | (2006.01) |
| *G06K 9/00* | (2006.01) |
| *G06T 7/00* | (2006.01) |
| *G06K 9/46* | (2006.01) |

(52) U.S. Cl.
CPC ........... *G06K 9/0063* (2013.01); *G06K 9/4638* (2013.01); *G06T 7/0026* (2013.01); *G06T 7/0085* (2013.01); *G06T 7/0097* (2013.01); *G06T 2207/10032* (2013.01); *G06T 2207/20024* (2013.01); *G06T 2207/30181* (2013.01)

(58) Field of Classification Search
CPC ... G06K 9/0063; G06K 9/4638; G06T 7/0026; G06T 7/0085; G06T 7/0097
See application file for complete search history.

(56) References Cited

U.S. PATENT DOCUMENTS

| | | | | |
|---|---|---|---|---|
| 6,385,340 B1 * | 5/2002 | Wilson | ................... | G06T 7/0044 382/218 |
| 6,771,836 B2 * | 8/2004 | Lawton | ................... | G06K 9/325 358/462 |
| 2003/0031385 A1 * | 2/2003 | Elad | ....................... | G06T 7/0085 382/300 |
| 2011/0013841 A1 * | 1/2011 | Blain | .................. | G06K 9/00651 382/174 |
| 2011/0229024 A1 * | 9/2011 | El-Maraghi | ........... | G06T 7/0083 382/162 |
| 2013/0230237 A1 * | 9/2013 | Schlosser | .............. | G06T 7/0081 382/164 |
| 2015/0332104 A1 * | 11/2015 | Kapach | ................ | G06K 9/6215 382/104 |

OTHER PUBLICATIONS

Lee et al, Shoreline Extraction From the Integration of Lidar Point Cloud Data and Aerial Orthophotos Using Mean Shift Segmentation, 2009, ASPRS Annual Conference, pp. 1-7.*
Jedlovec, G.J., et al., "Spatial and Temporal Varying Thresholds for Cloud Detection in GOES Imagery", IEE Transactions on Geoscience and Remote Sensing, vol. 6:3778-3781 (Jun. 2008).
Madani, H., et al., "Image Registration Using AutoLandmark", IEE Transactions on Geoscience and Remote Sensing Symposium, vol. 46(6):1705-1717 (Sep. 2004).
Wolfe, R.E., et al., "Achieving Sub-Pixel Geolocation Accuracy in Support of MODIS Land Science", Remote Sensing of Environment, vol. 83:31-49 (2002).

* cited by examiner

*Primary Examiner* — David F Dunphy
(74) *Attorney, Agent, or Firm* — Edell, Shapiro & Finnan, LLC

(57) ABSTRACT

Image navigation of an input image by edge registration proceeds by generating a reference image kernel in which edges of a reference image are embraced by borders. Image intensities of the reference image kernel internal to the borders increase with decreasing distance from the edges. A registration score is computed by cross-correlating the image intensities of the reference image kernel with image intensities in the input image. A feature exists in the input image when the registration score meets a registration criterion.

15 Claims, 6 Drawing Sheets

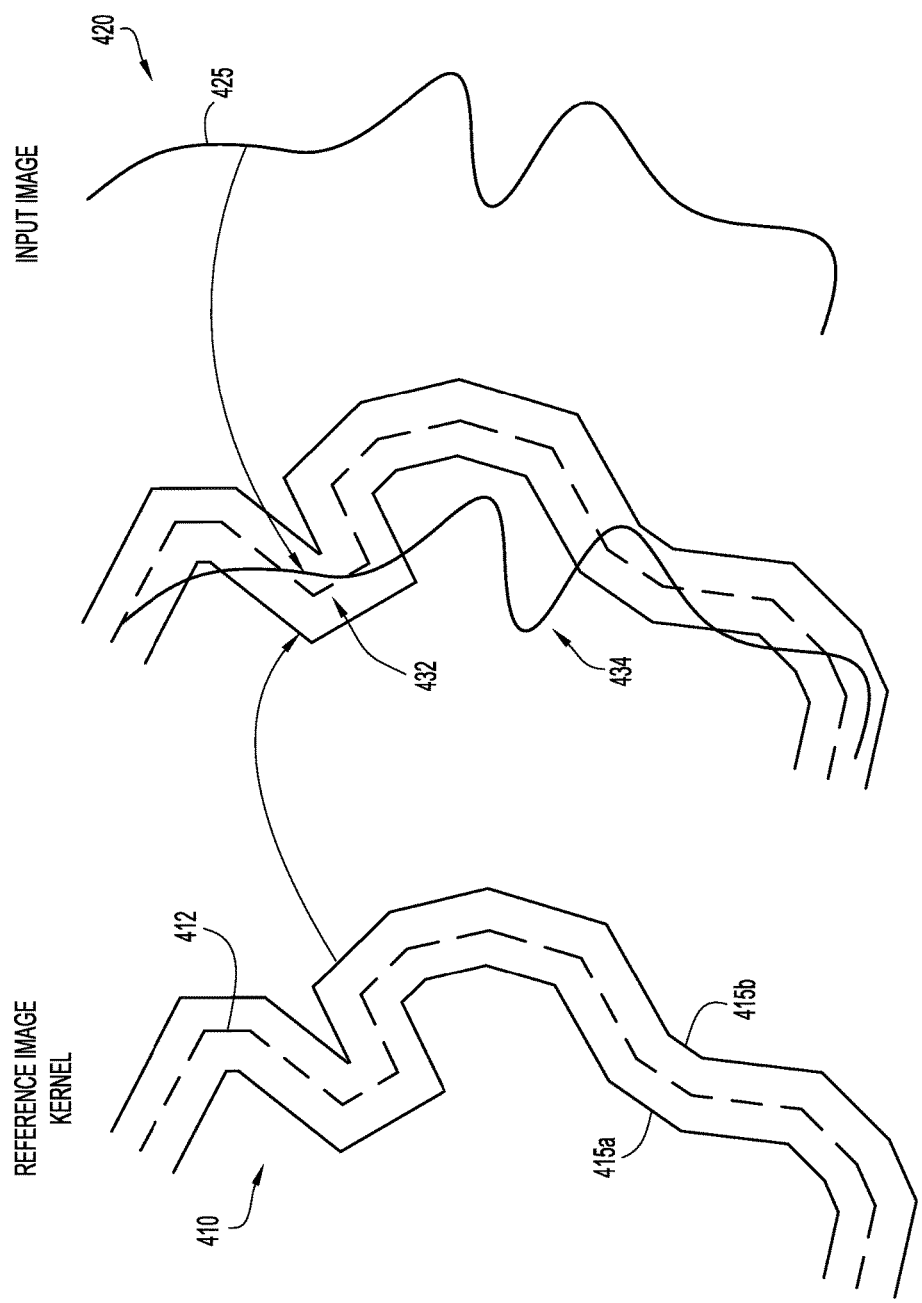

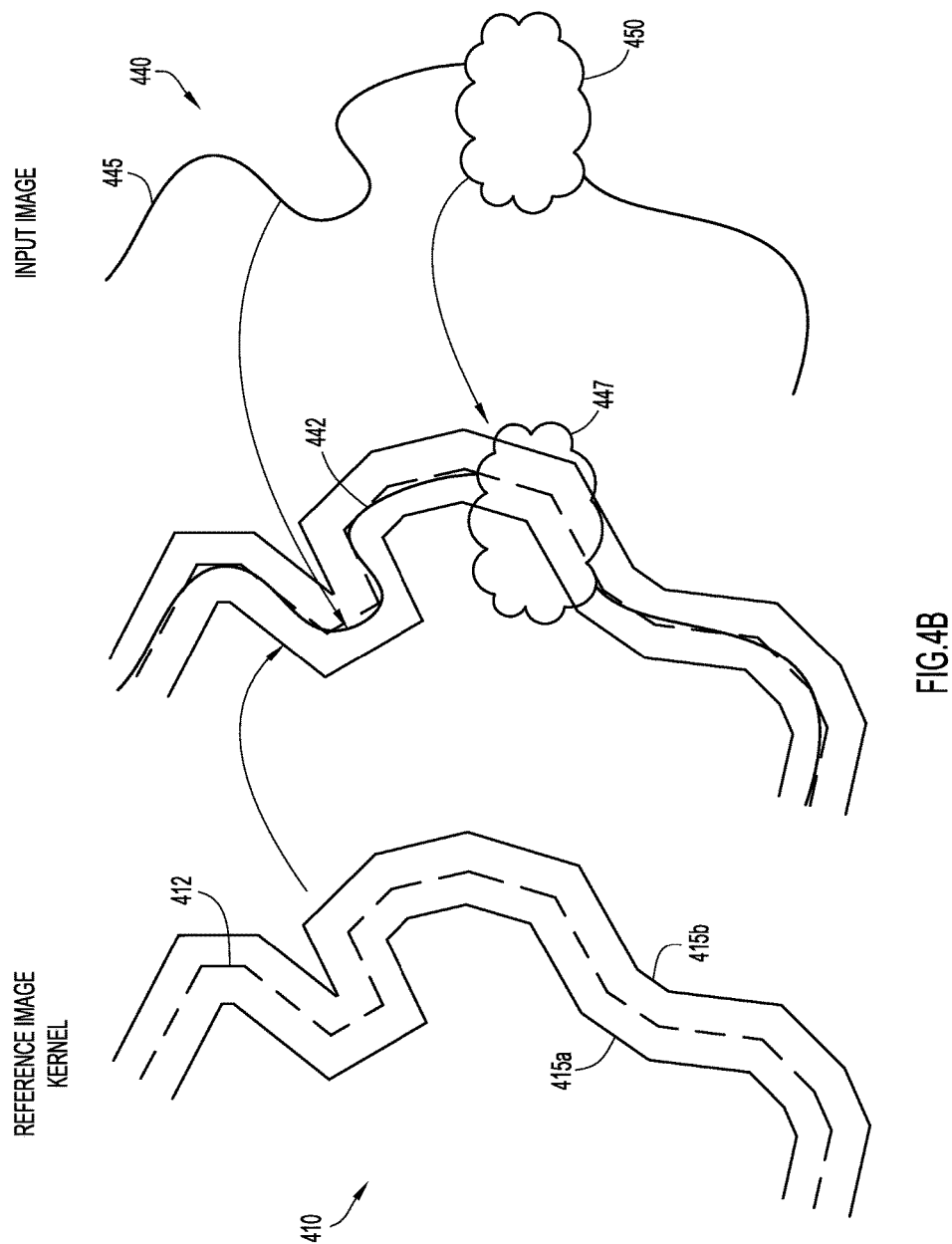

CLOUD RESILIENT ALGORITHM FOR COASTLINE REGISTRATION

TECHNICAL FIELD

The present disclosure relates to image processing and analysis and more specifically to image navigation and registration.

BACKGROUND

Various remote sensing applications generate imagery of the earth and determining the geographic location of each pixel in the imagery increases the usefulness of the data. The accurate location and pointing of each pixel is a two-part process. The first part, image navigation, determines the location of a pixel within an image relative to an earth-referenced latitude and longitude. The second part, image registration, entails maintaining the location of the pixels within an image and repeated images to their earth-referenced latitude and longitude. This unique process, image navigation and registration (INR), yields imaging data on a precisely located, fixed-earth coordinate grid.

One INR approach, "landmark registration," matches landmasses in the image against landmass truth data. Landmasses are separated by bodies of water such as oceans, seas, lakes, and rivers; a "shoreline" or, alternatively "coastline," is defined as the boundary between landmasses and water. Shorelines are often prominently visible features in remote sensing imagery and "shoreline registration" uses these land/water boundaries as image features to accomplish accurate landmark registration.

Landmark registration techniques are separated into two general classes—image-based registration and shoreline-based registration. Image-base landmark registration correlates the collected image with earlier collected reference images whose landmarks have been earth-referenced. Image-based correlation techniques are impacted by changes in lighting angle between images as well as scenic changes over different seasons. Additionally, image-based registration methods have difficulties with day-to-night land/water inversion that occurs in infrared imagery.

Shoreline-based registration uses any of the several available shoreline vector truth databases and compares the location of shoreline edges in the collected image with shoreline truth positions in the database. Shoreline-based techniques are insensitive to many of the shortcomings of the image-based landmark registration, such as dependence on lighting conditions. However, the existing vector-based INR techniques have several shortcomings including the use of cloud detection and mitigation algorithms, inaccuracies from resolution differences between collected imagery and the vector database, and plotted shoreline vector truth image do not accurately represent edge characteristics in collected imagery.

One inherent challenge to landmark navigation is that at any point in time the Earth is 70% covered in clouds that occlude part or all of a landmark being used for navigation. In order to mitigate this issue, cloud detection algorithms discount landmarks that are impacted by clouds. Most of the current state-of-the-art landmark navigation algorithms perform landmark registration by extracting landmark neighborhood sub-images, masking pixels containing clouds, retrieving pertinent coastline truth data from a landmark library, registering the sub-image to the coastline truth data using various methods, and computing a quality metric to assess the landmarks registration reliability.

One of the significant problems in landmark registration occurs when cloudy pixels have not been masked appropriately. The sole purpose of cloud detection in landmark navigation is to prevent errors caused by processing landmark regions that are obscured by clouds. The best published algorithms for cloud detection report an accuracy rate between 70% and 87% depending on day vs. night and land vs. ocean. An operational system using cloud detection based on these techniques could find itself using invalid data in computing landmark registration in at least ten percent of the cases, affecting scene navigation accuracy. Such systems require further algorithms to determine the validity of landmark navigation measurements, which in themselves may be in error.

One example of a cloud masking landmark registration method is the AutoLandmark utility that is used for Geostationary Operational Environmental Satellite (GOES) weather imagery. In the AutoLandmark algorithm, coastline edges are detected in the scene image with a Sobel operator using an absolute value norm. Cloud detection is used to mask off regions of clouds in the image. Then, a similarity measure is calculated for a set of offset positions by summing the edge image at the locations of the vector coastline. This effectively correlates the coastline vector with the edge image without including data from masked cloud regions. A triangular interpolation is used to calculate the effective edge location response at each coastline vector point.

Another weakness of landmark registration algorithms is that there is no mechanism to actively reduce the registration quality score when a portion of the image landmark does not match the shape of the landmark truth data. The lesser ability to differentiate between landmarks having similar shapes increases the probability of erroneously matching to the wrong landmark.

Lewis Fry Richardson was first to recognize that the length of a coastline is dependent on the unit measure being applied to the measurement. His work later led Mandelbrot to the notion of fractal dimension. This feature of coastlines is also important when imaging coastlines at various imaging resolution. At a high resolution, fine-edge features that are represented at lower resolution contribute to edge blur. This property is important in landmark registration where the truth data is available as a series of line segments at a given resolution and is used to plot an edge image at the required scale and perspective for correlation against remote-sensing imagery. Not taking this property into account contributes to registration error in landmark registration.

This same factor applies for algorithms that plot the shoreline vector truth data into an image for correlation with the edge image of the collected image. The standard plotting algorithms for generating line plots of vector data have been designed for providing a pleasing graphic of data, not to simulate the appearance of edges contained in an image. Plot images generated by these routine will giving the improper relative importance of sections of the shoreline over other sections leading to correlation location inaccuracies.

SUMMARY

Image navigation of an input image by edge registration proceeds by generating a reference image kernel in which edges of a reference image are embraced by borders. Image intensities of the reference image kernel internal to the borders increase with decreasing distance from the edges. A registration score is computed by cross-correlating the image intensities of the reference image kernel with image intensities in the input image. A feature exists in the input image when the registration score meets a registration criterion.

BRIEF DESCRIPTION OF THE DRAWINGS

FIGS. 4A-4B are graphical diagrams demonstrating cross-correlation of an input image with the reference image kernel of FIGS. 3A-3D.

DESCRIPTION OF EXAMPLE EMBODIMENTS

Figure 1:
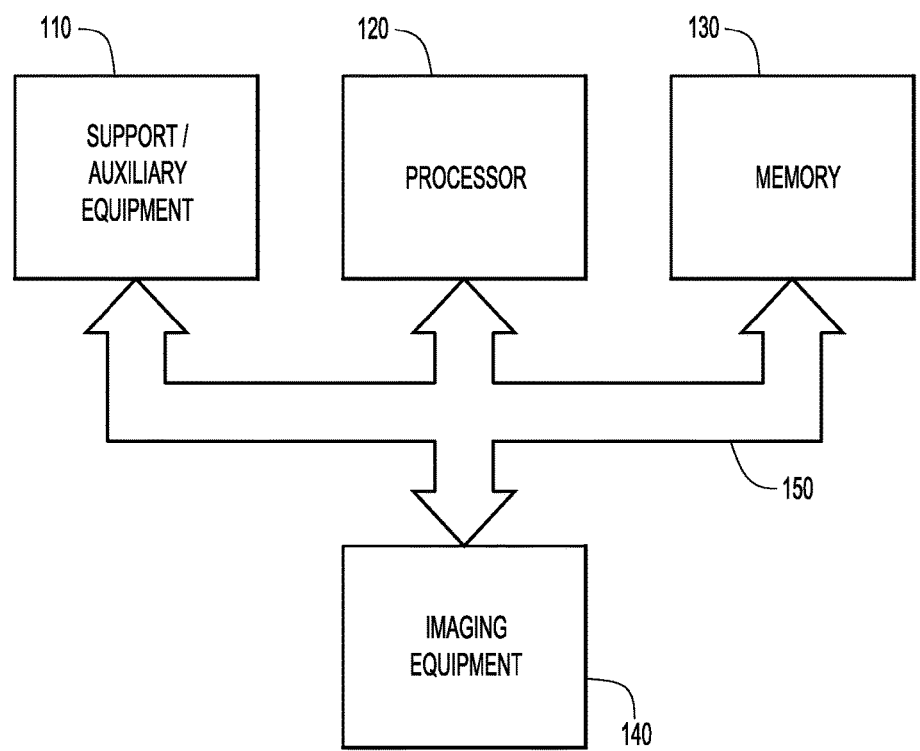
FIG. 1 is a schematic block diagram of an exemplary processing system by which the present general inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

Additionally, mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

The techniques described herein are directed to image navigation using shoreline registration. Upon review of this disclosure and appreciation of the concepts disclosed herein, the ordinarily skilled artisan will recognize other image navigation and registration contexts in which the present inventive concept can be applied. The scope of the present invention is intended to encompass all such alternative implementations.

FIG. 1 illustrates an exemplary system configuration suitable to practice the present invention. As illustrated in the figure, an exemplary data processing apparatus 100 may include processor 120, memory 130, support/auxiliary equipment 110 and imaging equipment 140 communicatively coupled one to another through interconnect equipment 150. Interconnect equipment 150 includes interface, control and processing circuitry sufficient to facilitate information exchange between components of data processing apparatus 100. It is to be understood that while interconnect equipment 150 is illustrated in FIG. 1 as a single bus, interconnect equipment 150 may include multiple, different signal-bearing media and may implement multiple, different interconnect hardware configurations, media access, signaling, pathfinding and/or routing techniques, communication protocols, etc. Communication operations implemented by interconnect equipment 150 may include network communications, e.g., Ethernet, Wi-Fi, cellular, etc., and serial communications, e.g., Universal Serial Bus (USB), RS-232, etc. The present invention is not limited to any particular communication media, signal type or protocol; those having skill in the art will recognize numerous communication techniques that can be used in conjunction with the present invention, as disclosed herein, without departing from the spirit and intended scope of the inventive concept.

Processor 120 may be constructed or otherwise configured to, among other things, execute processing instructions that implement various functional modules, such as those described below with reference to FIG. 2. It is to be understood that the present invention is not limited to a particular hardware configuration or instruction set architecture of processor 120, which may be configured by numerous structures that perform equivalently to those illustrated and described herein. Moreover, it is to be understood that while the processor 120 is illustrated as a single component, certain embodiments of the invention may include distributed processing implementations through multiple processing elements. Processor 150 may be realized through a wide variety of processing and interface circuitry including, but not limited to analog-to-digital converter circuits, digital-to-analog converter circuits, fixed digital logic circuits, programmable digital logic circuits, application specific circuits, etc., to implement, among other components, general data processors, data-specific processors, signal converters and conditioners, analog and digital signal processors, and so on. Those having skill in the art will recognize numerous processing configurations by which the present invention can be embodied without departing from the spirit and intended scope thereof.

Memory 130 may be utilized to store data and processing instructions on behalf of the exemplary data processing apparatus 100. Memory 130 may include memory that is distributed across components, to include, among others, cache memory and pipeline memory. Memory 130 may include persistent memory, such as one or more hard disk drives, or may be implemented in multiple persistent memory devices, which may be interconnected by a communication network, such as to implement one or more databases. Memory 130 may include electrical, magnetic and/or optical storage media and associated access mechanisms including, but not limited to electronic random access and/or read-only memory, flash memory, hard disk drive memory, compact disk memory and digital versatile disk memory to implement, among other things, executable code storage, application data storage, instruction and data registers, and instruction and data caches.

Imaging equipment 140 may include an imager such as a camera mounted on a platform suitable for transporting, pointing and operating the imager to collect image data. Imaging equipment 140 may collect image data on multiple spectral channels and is characterized by a known impulse response or point spread function. In certain embodiments, such characterization is modeled for purposes of shoreline edge plotting, as discussed in detail below. It is to be understood that the present invention is not limited to specific imagers or to specific platforms on which imagers are mounted. Those having skill in the art will recognize and appreciate numerous imaging devices and applications that can be used in conjunction with the present invention without deviating from the spirit and intended scope thereof.

Support/auxiliary equipment 110 may include general and application-specific mechanisms for implementing INR. In certain embodiments, support/auxiliary equipment 110 includes mechanisms by which the location and orientation of the platform on which imaging equipment 140 is mounted is ascertained. To that end, support/auxiliary equipment 110 may include gyroscopes, accelerometers, star-fix locating equipment, etc. Support/auxiliary equipment 110 may also input/output circuits including a display, a keyboard, a mouse, a track ball, a stylus, a touch screen, a touchpad, and/or other devices suitable to provide input to the data processing apparatus 100.

Figure 2:
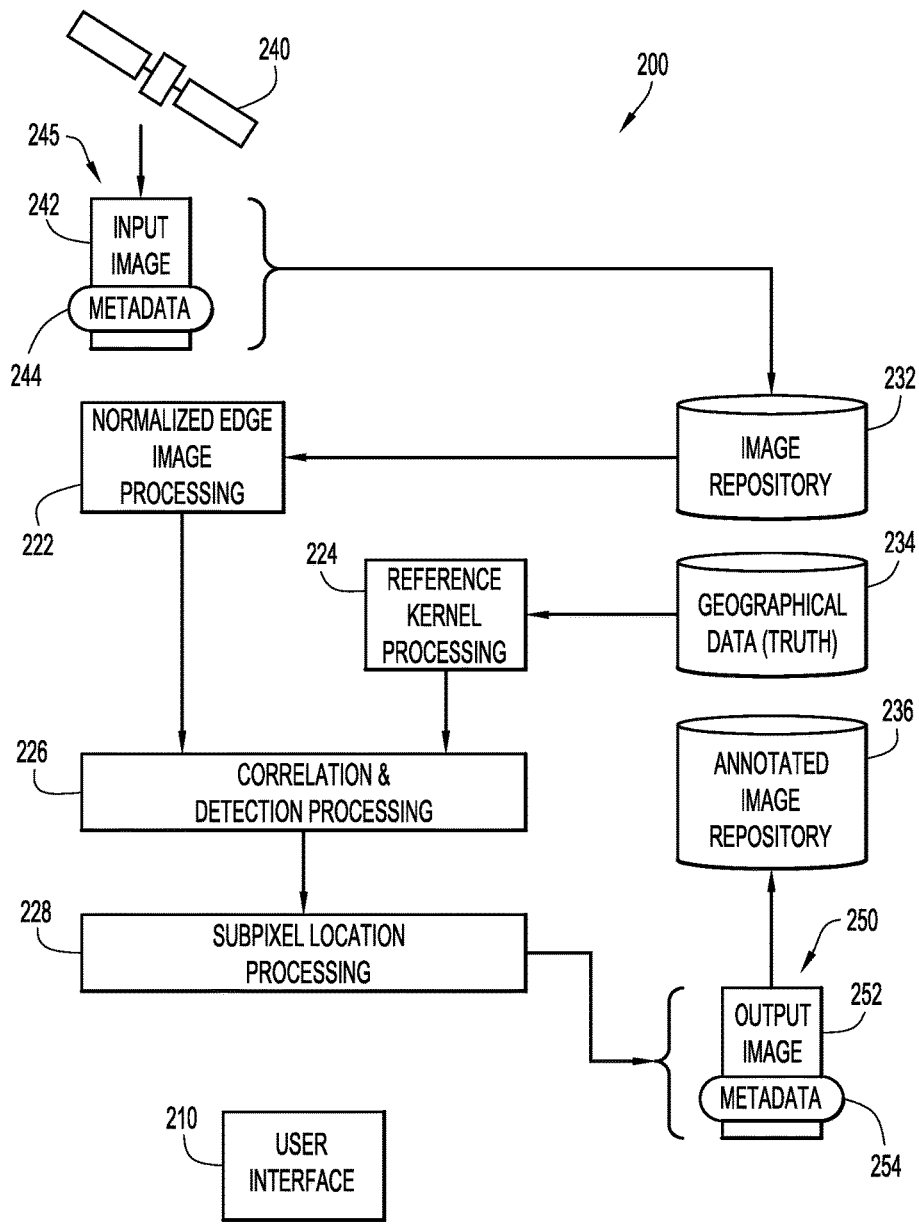
FIG. 2 is a schematic block diagram of an exemplary image registration system by which the present general inventive concept can be embodied.

FIG. 2 is a schematic block diagram of an exemplary image registration system 200 constructed or otherwise configured to carry out various image registration operations described herein. The exemplary system illustrated in FIG. 2 may be implemented through processing instructions executed on the processor 120 and in cooperation with other components illustrated in FIG. 1 to form an exemplary image registration system 200 on the exemplary data processing apparatus 100. User control and data analysis on image registration system 200 may be achieved via a suitable user interface 210 per the requirements of the application in which the present invention is embodied.

As illustrated in FIG. 2, a satellite 240 may include imaging equipment by which image data 245 is generated. Image data 245 may include an input image 242, e.g., a captured scene represented by logically arranged pixel values, and metadata 244 containing information regarding the captured scene, such as a timestamp, the identity, position and pointing direction of the imager, etc. Pixels within a satellite camera image are precisely located in terms of latitude and longitude on a celestial body being imaged, such as Earth. An earth-based processing system (not illustrated) may generate models of the satellite's orbit and attitude, respectively. The orbit model may be generated from measurements of stars and landmarks taken by the camera and by range data. The orbit model is an expression of the satellite's latitude and longitude at the sub-satellite point, and of the altitude of the satellite, as a function of time. The attitude model is based upon star measurements for the camera. The attitude model is a set of expressions for the deviations in a set of mutually orthogonal reference optical axes as a function of time. Measured data is fit into the models, such as by a walking least squares fit algorithm. A transformation computer transforms pixel coordinates as telemetered by the camera into earth latitude and longitude coordinates, using the orbit and attitude models.

Image data 245 may be stored in a suitable image repository 232. Subsequently, image data 245 may be retrieved from image repository 232 and provided to normalized edge image processing component 222 which prepares image data 245 for INR. For example, normalized edge image processing component 222 may extract the edges from input image 242 and may normalize intensities in the resulting edge image.

Reference kernel processing component 224 may generate a reference image kernel from geographical (truth) data stored in one or more databases 234. In certain embodiments, database 234 stores geographically accurate shoreline data in segments defined by pairs of endpoints, e.g., latitude and longitude. Shoreline landmarks may be plotted into a reference image by reference kernel processing component 224.

FIGS. 3A-3D, collectively referred to herein as FIG. 3, are graphical diagrams demonstrating basic image data processing operations by which an exemplary reference image kernel is generated. For purposes of explanation and not limitation, the processing operations will be described in a Cartesian coordinate system context; each graph of FIG. 3 represents a pixel value profile in the Y-Z plane (coinciding with the drawing sheet) of pixels in the X-Y plane (orthogonal to the drawing sheet). It is to be understood that the profiles illustrated in FIG. 3 are not drawn to a particular scale and that the present invention may be embodied with reference image kernels having edge profiles other than those illustrated and described in FIG. 3, such as by those described below.

Figure 3A:
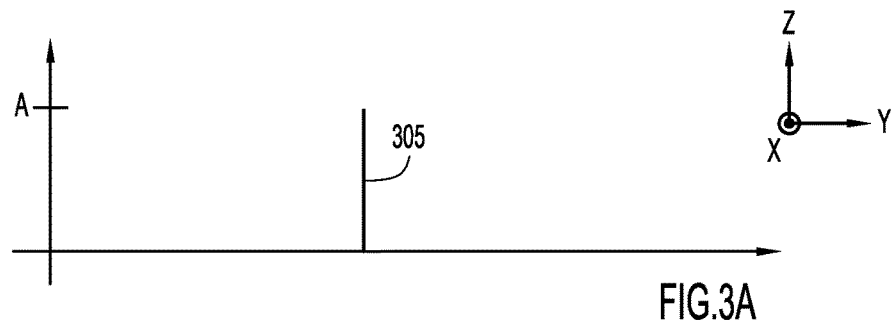
FIGS. 3A-3D are graphical diagrams demonstrating reference image kernel processing operations implemented in embodiments of the present general inventive concept.

FIG. 3A depicts an exemplary reference edge 305 of arbitrary magnitude A, but of known location and orientation. Reference edge 305 may be an item of what is collectively referred to herein as "truth data," i.e., data that has been previously mapped to a physical location in space and/or validated as representing a geographical feature, referred to herein as a "landmark." In one embodiment, truth data is obtained from a previously established shoreline vector database and incorporated into a raw reference image as a linear array of pixels each assigned a value of A to represent a shoreline segment.

Figure 3B:
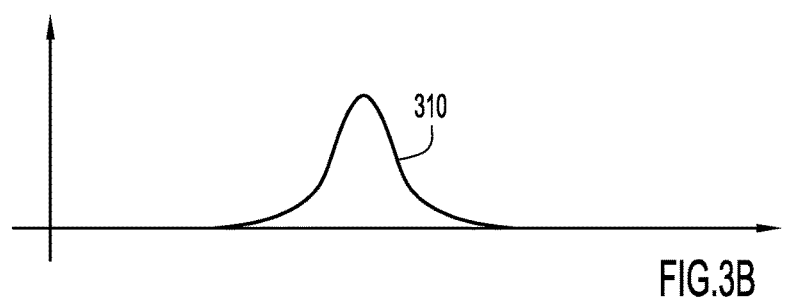

FIG. 3B depicts an exemplary imaged edge profile 310 produced by applying diffraction-limited imaging effects of a selected imager (e.g., the imaging device from which input images are produced) to reference edge 305. In one embodiment, imaged edge profile 310 may be generated by convolving reference edge 305 with the impulse response (IPR) of the selected imager. The result is a distribution of pixel values, e.g., imaged edge profile 310, aligned in the reference image with reference edge 305 (orthogonal to the drawing sheet). In certain embodiments, the selected imager's IPR may be estimated or otherwise simplified, or may substituted with, for example, a Gaussian curve response, which is a reasonable diffraction-limited response estimate of many imaging systems.

Figure 3C:
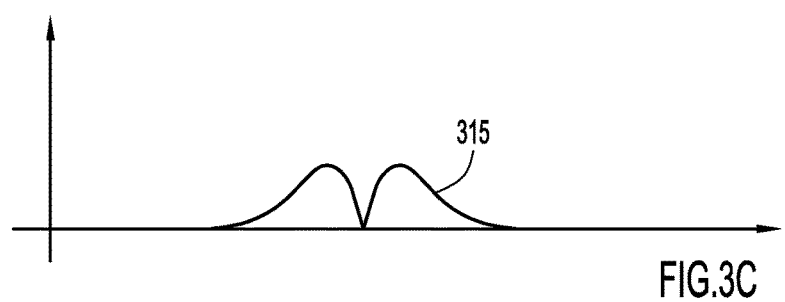

FIG. 3C depicts an exemplary border profile 315 that may be used to define a border on each side of reference edge 305, the purpose of which will be explained below with reference to FIG. 3D. In one embodiment, a gradient (edge) filter with absolute value normalization, by which negative values are reflected about the X-axis as positive values of the Z-axis. When the present invention is so embodied, a bilateral pixel value distribution is produced having null values at the location of reference edge 305.

Figure 3D:
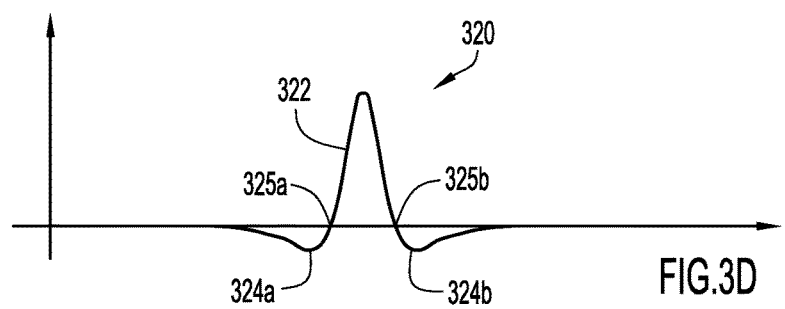

FIG. 3D depicts an exemplary edge profile 320 by which an input image can be navigated. Edge profile 320 may be generated by subtracting border profile 315 from imaged edge profile 310 to define edge borders 325a and 325b, representatively referred to herein as edge border(s) 325, an internal (relative to borders 325) zone 322 of positive pixel values and two external (relative to borders 325) zones 324a and 324b, representatively referred to herein as external zone(s) 324, of negative pixel values. By way of such profile, pixels of an input image falling within borders 325 of edge profile 320 obtain greater weight in correlation, whereas those pixels of the input image falling outside the borders 325 are given zero, and even negative weight in the correlation.

Returning now to FIG. 2, a normalized edge image generated by normalized edge image processing component 222 and a reference image kernel generated by reference kernel processing component 224 may be provided to a correlation and detection processing component 226. FIG. 4A is an illustration of exemplary operations by which an input image 420 is cross-correlated with a reference image kernel 410. For purposes of explanation and not limitation, it is to be assumed that reference image kernel 410 has been constructed by operations similar to those described above with reference to FIG. 3 (and further below with reference to FIG. 5) using shoreline truth data. Thus, exemplary reference image kernel 410 comprises borders 415a and 415b, representatively referred to herein as borders 415, between which a correlation profile is constructed having a maximum at the location 412 of the shoreline. Outside of borders 415, the correlation profile comprises negative and zero (non-positive) pixel values as described above. Input image 420 comprises an edge 425 (e.g., a shoreline) that has been extracted and normalized from image data. As illustrated in FIG. 4A, cross-correlation of reference image kernel 410 and input image 420 results in regions of shoreline falling within borders 415, as generally illustrated at region 432, and regions falling outside borders 415, generally illustrated region 434. As explained above, pixels of edge 425 that fall within borders 415 will be assigned a positive weight with the greatest weight being achieved at the peak of the edge profile, i.e., line 412 corresponding to the shoreline truth.

Input image 420 of FIG. 4A depicts an example scenario in which the landmark does not match well with the truth data, as indicated by the high degree to which image edge 425 falls outside borders 415. By contrast, input image 440 of FIG. 4B contains a landmark having shoreline edge 445 that matches well with the truth data, but a portion of the shoreline is occluded by a cloud 450. When input image 440 is subjected to edge extraction, the resulting image will contain the edge 442 extracted from the shoreline 445 and the edge 447 extracted from the cloud 450. When cross-correlated with reference image kernel 410, the edge 442 will be highly accentuated given its alignment on peak 412 between borders 415. Edge 442 is gapped due to the occlusion of cloud 450 (with the edges 447 of cloud 450 extracted with edge 442), but the high degree of correlation of the edge 442 within borders 415, and the negative values assigned to cloud edges 447 outside the borders 415, produces a high correlation score without having to perform cloud detection and mitigation.

Returning once again to FIG. 2, the resulting correlated image may be further filtered by correlation and detection processing component 226 using a detection kernel by which the largest peak detection response is determined and compared the detection threshold. If detection threshold criteria are met, further processing may be executed to calculate a subpixel accurate location of the landmark by subpixel location processing component 228. The subpixel-accurate location of the landmark may be calculated using a subpixel maxima location correlation technique. The resulting output image data 250 may contain an output image 252, which may be identical to the input image 242, and metadata 254 that includes, for example, overlay data that defines the geographical pixel locations.

Figure 5:
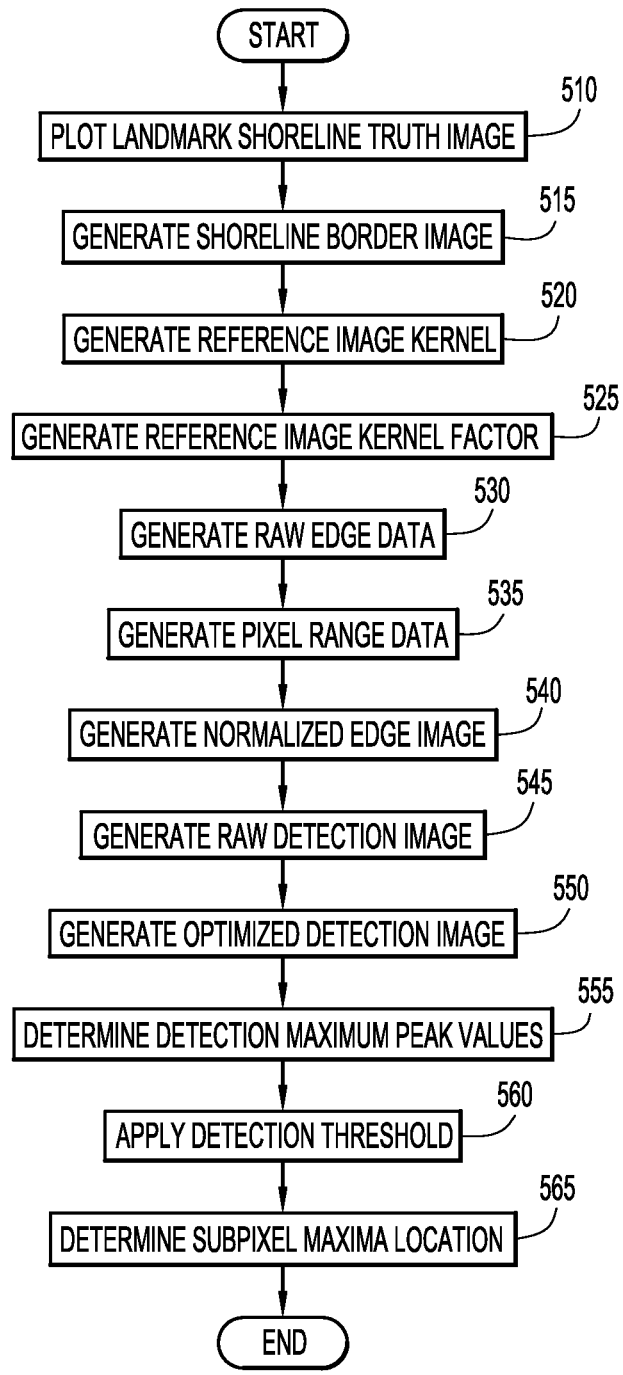
FIG. 5 is a flow diagram of an exemplary image registration process by which the present general inventive concept can be embodied.

FIG. 5 is a flow diagram of an exemplary image registration process 500 by which the present invention may be embodied. In operation 510, a landmark truth image is plotted from, for example, data maintained in a shoreline vector database. This operation generates a representation of the shoreline truth data as an edge image in the same grid and resolution as the collected landmark scene from the perspective of the estimated instrument collection location. For optimal subpixel performance (discussed further below), the plot is generated in a manner that simulates the edge that would result from the imaging instrument. In this Shoreline Truth Image, zero represents the background where no shoreline edge exists and the non-zero values represent the edge of the coastline. The center of this image is assigned the truth position of the landmark for the purposes of navigation. This will correspond to the scene image location. The Shoreline Truth Image can be constructed by:

$$\text{shorelineTruthImage} = \text{EdgePlot}\{\text{ShorelineTruthVector}\} \tag{1}$$

In the case where two images are being registered to each other, the edge data from one image is used as the Shoreline Truth Image instead of this plotting process.

In one embodiment, the Shoreline Truth Vector plotting technique processes the vector data to generate a horizontal and vertical edge image that is combined as an edge magnitude to produce the final reference image. The underlying mathematics uses the two-dimensional Gaussian distribution curve as an approximation of the instrument impulse response (IPR).

The shoreline vectors follow a sequence of points with floating point image coordinates $(R_i, C_i)$ and represent a segment of the shoreline. These coordinates may be translated to correspond with the expected perspective of the collected image. There may be many segments in the shoreline truth data for each image.

In certain embodiments, a neighborhood of pixels is defined for each component shoreline vector $\overrightarrow{BC}$ with endpoint coordinates $(R_B, C_B)$ and $(R_C, C_C)$. Pixels of the shoreline truth image within the neighborhood will be assigned values based on the Gaussian approximation to the imager's IPR. In one example, the rectangular neighborhood is established with:

$$R_{min} = \text{MIN}(0, R_B, R_C), \tag{1-1}$$

$$R_{max} = \text{MAX}(\text{Rows}, R_B, R_C), \tag{1-2}$$

$$C_{min} = \text{MIN}(0, C_B, C_C), \tag{1-3}$$

$$C_{max} = \text{MAX}(\text{Columns}, C_B, C_C), \tag{1-4}$$

where Rows and Columns are the number of rows and columns, respectively, of pixels in the shoreline truth image. The length of the shoreline vector component can be determined from, $$L = \sqrt{(\Delta R_{CB})^2 + (\Delta C_{CB})^2}, \tag{1-5}$$

where $$\Delta R_{CB} = R_C - R_B, \tag{1-6}$$

$$\Delta C_{CB} = C_C - C_B. \tag{1-7}$$

If the length of the vector is not zero, each pixel ($R_A$, $C_A$) in the neighborhood is assigned an IPR value. To that end, component distances from pixel coordinate ($R_A$, $C_A$) to the vector endpoints are calculated:

$$\Delta R_{BA} = R_B - R_A, \quad (1\text{-}8)$$

$$\Delta C_{BA} = C_B - C_A, \quad (1\text{-}9)$$

$$\Delta R_{CA} = R_C - R_A, \quad (1\text{-}10)$$

$$\Delta C_{CA} = C_C - C_A. \quad (1\text{-}11)$$

The perpendicular distance of the pixel to the component vector may be determined from:

$$D = \frac{\Delta R_{CB} \Delta C_{BA} - \Delta C_{CB} \Delta R_{BA}}{L}, \quad (1\text{-}12)$$

and, if the perpendicular distance is zero, a determination is made as to whether the pixel lies on the vector segment of the line, such as by calculating the dot product:

$$P = \Delta C_{CA} \Delta C_{BA} + \Delta R_{CA} \Delta R_{BA}. \quad (1\text{-}13)$$

If P=0, the image pixel ($R_A$, $C_A$) is located on an endpoint of the vector line and horizontal and vertical edge contributions $E_H$ and $E_V$, respectively, may be established as:

$$E_H = \frac{\Delta C_{CB}}{\sqrt{2\pi}\, L\sigma}, \quad (1\text{-}14)$$

$$E_V = \frac{\Delta R_{CB}}{\sqrt{2\pi}\, L\sigma}. \quad (1\text{-}15)$$

If P<0, the image pixel ($R_A$, $C_A$) is located on the vector line segment between the endpoints and, again, the horizontal and vertical edge components may be established as:

$$E_H = \frac{\Delta C_{CB}}{2\sqrt{2\pi}\, L\sigma}, \quad (1\text{-}16)$$

$$E_V = \frac{\Delta R_{CB}}{2\sqrt{2\pi}\, L\sigma}. \quad (1\text{-}17)$$

If P>0, the image pixel ($R_A$, $C_A$) does not fall on the vector line segment and:

$$E_H = 0, \quad (1\text{-}18)$$

$$E_V = 0. \quad (1\text{-}19)$$

If the perpendicular distance D from the vector line BC to the current image pixel ($R_A$, $C_A$) is non-zero, the horizontal and vertical edge contributions of the vector to pixel ($R_A$, $C_A$) may correspond to a Gaussian model of the imager's IPR:

$$E_H = \frac{\Delta C_{CB}}{L} |G(D, m_B, \sigma) - G(D, m_C, \sigma)|, \quad (1\text{-}20)$$

$$E_V = \frac{\Delta R_{CB}}{L} |G(D, m_B, \sigma) - G(D, m_C, \sigma)|, \quad (1\text{-}21)$$

where, $$m_B = \frac{\Delta C_{CB} \Delta C_{BA} + \Delta R_{CB} \Delta R_{BA}}{D} L, \quad (1\text{-}22)$$

$$m_C = \frac{\Delta C_{CB} \Delta C_{CA} + \Delta R_{CB} \Delta R_{CA}}{D} L, \quad (1\text{-}23)$$

and, $$G(D, m, \sigma) = \quad (1\text{-}24)$$

$$\frac{m\left(\text{Erf}\left(\frac{D\sqrt{1+m^2}}{\sigma\sqrt{2}}\right) - 1\right) - e^{-D^2/2\sigma^2\sqrt{1+m^2}} \text{Erf}\left(\frac{mD}{\sigma\sqrt{2}}\right)}{\sigma\sqrt{8\pi(1+m^2)}}.$$

Erf( ) is the standard Gaussian error function.
The horizontal and vertical edge contributions may be added to the respective horizontal and vertical edge component images $I_H$ and $I_V$, respectively:

$$I_H(R_A, C_A) = I_H(R_A, C_A) + E_H \quad (1\text{-}25)$$

$$I_V(R_A, C_A) = I_V(R_A, C_A) + E_V \quad (1\text{-}26)$$

Once all the shoreline vector segments have been processed, the horizontal and vertical edge component images $I_H(R, C)$ and $I_V(R, C)$ may be combined into a shoreline truth image I(R, C), such as by computing a magnitude at each pixel location (R, C):

$$I(R,C) = \sqrt{(I_H(R,C))^2 + (I_V(R,C))^2} \quad (1\text{-}27)$$

In operation 515 of process 500, a shoreline border image is generated from the shoreline truth image I(R, C). The shoreline border image is the image gradient of the shoreline truth image I(R, C). The pixel values in the shoreline border image form a border on each side of the shoreline truth edge I(R, C) to diminish the registration match score when edges in the image stray from following the shoreline truth. In one embodiment, a shoreline border image B(R, C) is generated by applying a gradient filter to the shoreline truth image I(R, C) plotted in operation 510:

$$B(R,C) = \text{GradientFilter}\{I(R,C)\} \quad (2)$$

In operation 520, a reference image kernel $K_R(I, C)$ is generated, such as by subtracting the shoreline border image B(R, C) from the shoreline truth image I(R, C). Certain values in reference image kernel $K_R(I, C)$ will be negative, which serves to diminish the match score for image edges that cross the border, as discussed above.

$$K_R(R,C) = I(R,C) - B(R,C) \quad (3)$$

In operation 525, a reference image kernel factor $KF_R$ is generated, such as by summation of all pixel values in reference image kernel $K_R(R, C)$, which is used in Eq. 11 below to normalize the detection match scores by the length of the shoreline component so that the scores are comparable between landmarks:

$$KF_R = \Sigma_i \Sigma_j K_R(i,j) \quad (4)$$

In operation 530, raw edge data $E_S(X, Y)$ are generated from the landmark scene image S(X, Y), such as by using a gradient filter that produces edge magnitudes. The gradient filter may be derived from the instrument effective Impulse Response Function (IPR) or may be a Gaussian-derived kernel which approximates most well-designed instrument responses.

$$E_S(X,Y) = \text{GradientFilter}\{S(X,Y)\} \quad (5)$$

In operation 535, pixel range data $R_P(X, Y)$ are generated from the landmark scene image $S(X, Y)$ as the difference of the maximum and minimum values within a neighborhood about each landmark scene image pixel $(X, Y)$. The neighborhood is a small extended region centered on each pixel. Generally, the pixel data range in a natural image will never be zero. However, suitable preventive measures against dividing by zero in the next step by setting any resultant zero to the value of one. This does not skew the edge information because there are no edges in any region where the range is zero.

$$R_P(X,Y) = \text{Max}\{S(X-\text{size} \ldots X+\text{size}, Y-\text{size} \ldots Y+\text{size})\} - \text{Min}\{S(X-\text{size} \ldots X+\text{size}, Y-\text{size} \ldots Y+\text{size})\} \quad (6)$$

In operation 540, a normalized edge image $E_N(X\ Y)$ contains the normalized edge data from the image that is used to determine where the landmark is located in the scene. The normalized edge image $E_N(X, Y)$ may be generated from the raw edge data $E_S(Y, Y)$ and the pixel range data $R_P(X, Y)$ by dividing each pixel in the raw edge data $E_S(X, Y)$ by its corresponding pixel in the pixel range data $R_P(X\ Y)$:

$$E_N(X, Y) = \frac{E_S(X, Y)}{R_P(X, Y)}. \quad (7)$$

In operation 545, a raw detection image $I_D(R, C)$ is a first correlation result to compare the normalized edge image $E_N(X, Y)$ to the reference image kernel $K_R(R, C)$. This image will show a peak where the landmark resides, if it is visible in the image, which will be further enhanced in the second stage of correlation. A feature of this image is that the neighborhood around the best match locations will have lower values because of the unique shape of the reference image kernel that discounts the edge border. This reduction in response happens when the plot coastline is slightly off its peak match, the normalized edge correlation will be lower and the border correlation will be higher. The effective subtraction of the latter from the former provides the lower detection response. This preprocesses the combined correlation image to place a more distinct recognizable feature at the coastline match location that can be detected more effectively. In an ideal match, this feature will be similar in response as that of the detection kernel. The raw detection image $I_D(R, C)$ may be generated by correlating the normalized edge image $E_N(X, Y)$ with the reference image kernel $K_R(R, C)$, $$I_D(R,C) = E_N(X,Y) \otimes K_R(R,C). \quad (8)$$

In operation 550, an optimized detection image $I_{DO}(R, C)$ may be generated by correlating the raw detection image $I_D(R, C)$ with a detection kernel $K_D(R, C)$. This processing boosts the detection seen in the raw detection image $I_D(R, C)$ because this is a matched filter against the expected correlation response when the plotted shoreline kernel is aligned with the correct shoreline in the collected remote-sensing image. In the presence of some clouds, the detection score will be reduced, but will still be considered a good detection. It is statistically unlikely to attain a large response for the coastline occluded by clouds because of the uniqueness in the shape of the coastline.

$$I_{DO}(R,C) = I_D(R,C) \otimes K_D(R,C). \quad (9\text{-}1)$$

Detection kernel $K_D(R, C)$ is generated by subtracting the self-convolution of the gradient filter kernel from the gradient filter kernel.

$$K_D(R,C) = \text{gradientKernel} - \text{gradientKernel} \otimes \text{gradientKernel} \quad (9\text{-}2)$$

In operation 555, the maximum response in the detection image is determined by scanning the optimized detection image $I_{DO}(R, C)$ to find the location of the maximum value. If the relative threshold method is being used in operation 560, the next highest detection value is also determined, excluded the neighborhood of pixel around the maximum value.

There are several methods for applying the detection threshold that may be used depending on the characteristics of the remote-sensing imagery being processed and the selection landmark shorelines being used. One example method uses a relative threshold where the peak detection response value is compared to the next highest peak. This method dynamically adjusts to the imaging characteristics. This ratio of the peak detection response to the next highest peak is compared to the detection ratio threshold.

$$\text{Landmark} = \begin{cases} \text{found,} & \frac{peakValue}{nextHighestPeak} < DetRadioThr \\ \text{not found,} & \frac{peakValue}{nextHighestPeak} \geq DetRadioThr \end{cases} \quad (10)$$

Another example method compares the peak detection response value to a constant threshold. This method may be used when the set of imagery have a consistent statistical characteristics. The reference kernel factor $KF_R$ is included in this threshold calculation to account for different lengths of shoreline.

$$\text{Landmark} = \begin{cases} \text{found,} & \frac{peakValue}{KF_R} < DetThr \\ \text{not found,} & \frac{peakValue}{KF_R} \geq DetThr \end{cases} \quad (11)$$

If the detection threshold process declares a successful match, then sub-pixel positioning is executed, which determines a subpixel position based on the peak response location and the optimized detection. Otherwise the process declares that the landmark shoreline was not found.

In operation 565, subpixel maxima locations of the landmark are determined using a neighborhood of pixels in the optimized detection image around the landmark peak location to refine the estimate of the landmark position within the collected landmark image.

An exemplary method conducts a subpixel search for the maximum response location in a range that is one half pixel around the maximum optimized detection image pixel at $(i_{peak}, j_{peak})$. The calculation correlates a small pixel region around $(i_{peak}, j_{peak})$ with a two dimensional Gaussian surface that has shifted by the range of subpixel steps to find the location where the maximum response is located. This shift is the subpixel correction to the location of the maximum detection image pixel that locates the landmark coastline in the scene image.

The (Δi, Δj) is determined where the maximum response of the following calculation:

$$\text{score}(\Delta i, \Delta j) = \qquad (12)$$

$$\sum_{i=-3}^{3}\sum_{j=-3}^{3} D(i+i_{peak}, j+j_{peak})\frac{1}{2\pi\sigma^2}e^{-\frac{(i-\Delta i)^2+(j-\Delta j)^2}{2\sigma^2}},$$

$$-0.5 \le \Delta i \le 0.5, -0.5 \le \Delta j \le 0.5$$

The final subpixel resolution landmark location is:

$$(i_{peak}+\Delta i, j_{peak}+\Delta j) \qquad (13)$$

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A method of image navigation of an input image by edge registration, the method comprising:
   generating a reference image kernel having borders embracing edges that conform to edges of a reference image and image intensities of the reference image kernel internal to the borders increase with decreasing distance from the edges embraced thereby, the reference image indicating a geographic location of a feature therein;
   computing a registration score by cross-correlating the image intensities of the reference image kernel with image intensities of edges in the input image;
   assigning the geographic location of the feature in the reference image to the feature in the input image responsive to the registration score meeting a registration criterion; and
   storing the input image of the feature with the geographic location thereof in a memory device.

2. The method of claim 1, wherein generating the reference image kernel comprises:
   applying a gradient filter to the edges of the reference image; and
   subtracting the image intensities of the filtered edges from the image intensities of the edges to form the borders of the reference image kernel.

3. The method of claim 2 further comprising:
   retrieving truth data corresponding to the feature in the input image; and
   generating the edges of the reference image from the truth data.

4. The method of claim 3, wherein retrieving the truth data comprises retrieving, as the truth data, an image of shoreline vector data.

5. The method of claim 3, wherein retrieving the truth data comprises retrieving, as the truth data, a previously navigated image.

6. The method of claim 1 further comprising:
   extracting the edges from the input image; and
   normalizing the extracted edge data prior to cross-correlating the image intensities of the reference image kernel with the image intensities of edges in the input image.

7. An image processing apparatus comprising:
   a database storing data from which a reference image is generated, the data including a geographic location of a feature in the reference image;
   a processor configured to:
      generate a reference image kernel having borders embracing edges that conform to edges of the reference image and image intensities internal to the borders of the reference image kernel increase with decreasing distance from the edges embraced thereby;
      compute a registration score by cross-correlating the image intensities of the reference image kernel with image intensities of edges in an input image;
      assign the geographic location of the feature in the reference image to the feature in the input image responsive to the registration score meeting a registration criterion; and
      store the input image of the feature with the geographic location thereof in a memory device.

8. The apparatus of claim 7, wherein the processor is further configured to:
   apply a gradient filter to the edges of the reference image; and
   subtract the image intensities of the filtered edges from the image intensities of the edges to form the borders of the reference image kernel.

9. The apparatus of claim 8, wherein the processor is further configured to:
   retrieve truth data corresponding to the feature in the input image; and
   generate the edges of the reference image from the truth data.

10. The apparatus of claim 9, wherein the processor is further configured to retrieve, as the truth data, shoreline vector data.

11. The apparatus of claim 9, wherein the processor is further configured to retrieve, as the truth data, a previously navigated image.

12. The apparatus of claim 7, wherein the processor is further configured to:

extract the edges from the input image; and normalize the extracted edge data prior to cross-correlating the image intensities of the reference image kernel with the image intensities of edges in the input image.

13. A tangible, non-transient medium having instructions encoded thereon that, when executed by a processor, cause the processor to:

generate a reference image kernel having borders embracing edges that conform to edges of a reference image and image intensities internal to the borders of the reference image kernel increase with decreasing distance from the edges embraced thereby, the reference image indicating the geographic location of a feature therein;

compute a registration score by cross-correlating the image intensities of the reference image kernel with image intensities of edges in the input image;

assign the geographic location of the feature in the reference image to the feature in the input image responsive to the registration score meeting a registration criterion; and store the input image of the feature with the geographic location thereof in a memory.

14. The tangible, non-transient medium of claim 13 having additional instructions encoded thereon that, when executed by the processor, cause the processor to:

apply a gradient filter to the edges of the reference image; and subtract the image intensities of the filtered edges from the image intensities of the edges to form the borders of the reference image kernel.

15. The tangible, non-transient medium of claim 14 having additional instructions encoded thereon that, when executed by the processor, cause the processor to:

retrieve truth data corresponding to a landmark being sought in the input image; and generate the edges of the reference image from the truth data.

* * * * *